US006547976B2

(12) United States Patent
Beguin

(10) Patent No.: US 6,547,976 B2
(45) Date of Patent: Apr. 15, 2003

(54) HIGH PRECISION ALIGNMENT OF OPTICAL WAVEGUIDE FEATURES

(75) Inventor: Alain M. J. Beguin, Vulaines sur Seine (FR)

(73) Assignee: Corning Incorporated, Corning, NY (US)

( * ) Notice: Subject to any disclaimer, the term of this patent is extended or adjusted under 35 U.S.C. 154(b) by 147 days.

(21) Appl. No.: 09/735,774

(22) Filed: Dec. 13, 2000

(65) Prior Publication Data

US 2002/0074308 A1 Jun. 20, 2002

(51) Int. Cl.⁷ .................................. B44C 1/22
(52) U.S. Cl. ............... 216/24; 216/51; 216/59
(58) Field of Search .................... 216/2, 24, 33, 216/35, 38, 41, 51, 59, 67, 79; 438/725, 735, 743

(56) References Cited

U.S. PATENT DOCUMENTS

| 5,529,595 A | 6/1996 | Ueki et al. |
| 5,736,429 A | 4/1998 | Tregoat et al. |
| 5,841,931 A | 11/1998 | Foresi et al. |

FOREIGN PATENT DOCUMENTS

| EP | 0 318267 A | 5/1989 |
| EP | 0 798768 A | 10/1997 |
| JP | 06 118256 A | 4/1994 |
| WO | WO 99/05549 | 2/1999 |

OTHER PUBLICATIONS

Patent Abstracts of Japan; Jul. 6, 1994; vol. 018, No. 478 (P–1796).

*Primary Examiner*—William A. Powell
(74) *Attorney, Agent, or Firm*—Walter M. Douglas

(57) ABSTRACT

A method of manufacturing a planar or integrated optical circuit in which a core layer (20) is formed on a substrate (10) and patterned to define optical features (such as waveguides) using a mask having a first portion (30) defining the desired core patterns (20*a*) and a second portion (35) corresponding to one or more alignment marks (20*b*). After etching the core layer, only the first portion (30) of the mask is removed, the second portion (35) of the mask being left to provide alignment marks (20*b*) which are highly visible through the subsequently-deposited overclad layer (40). The alignment marks (20*b*) are very accurately positioned with respect to the core patterns (20*a*), thus enabling further optical devices to be overlaid on the existing structure with accurate alignment to the underlying core patterns. The mask material (35) left on the alignment marks (20*b*) may be partially oxidized before the overclad is deposited.

8 Claims, 2 Drawing Sheets

Figures 1A - 1F Prior Art
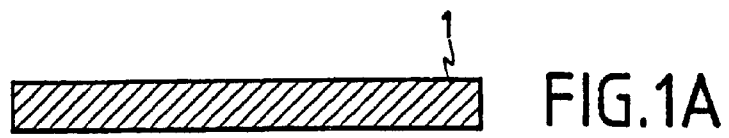
FIG.1A
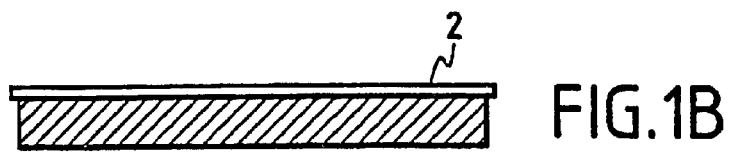
FIG.1B
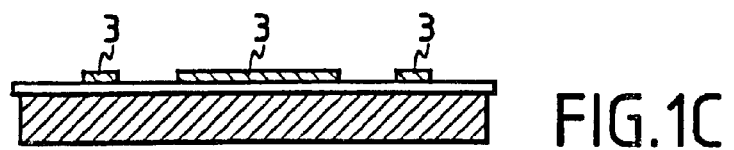
FIG.1C
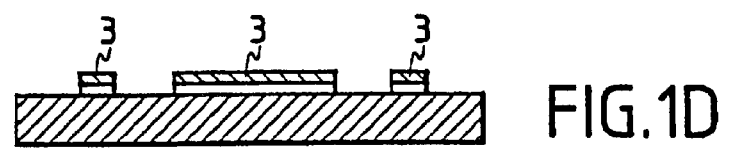
FIG.1D
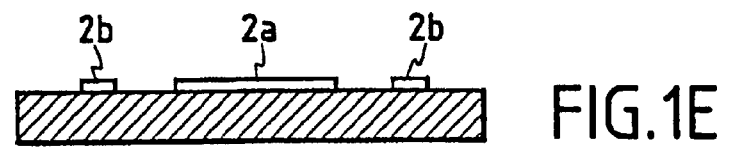
FIG.1E
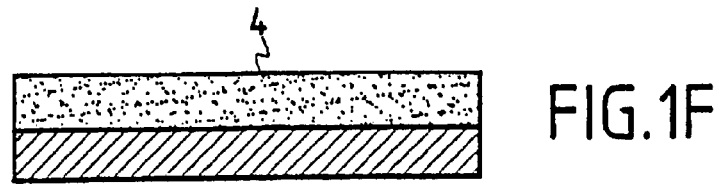
FIG.1F

HIGH PRECISION ALIGNMENT OF OPTICAL WAVEGUIDE FEATURES

BACKGROUND OF THE INVENTION

1. Field of the Invention

The present invention relates to the field of integrated optics, more particularly to the manufacture of planar or integrated optical circuits and the alignment of optical features and devices in superposed layers of such circuits.

2. Technical Background

In the manufacture of planar or integrated optical circuits it is often necessary to create superposed layers of optical features or devices (such as waveguides, gratings, detectors, mirrors, trenches, and so forth). For example, there could be a first set of waveguides (or other optical features or physical structures) created in a first layer formed on a substrate, and a second set of different waveguides (or different optical features or physical structures) formed in a second layer, superposed on the first layer. During manufacture of such circuits, the problem arises of correctly aligning the features and devices of the upper layer with respect to those in the lower layer (or layers). This problem can be better understood from a consideration of a conventional process for manufacturing waveguides on a substrate. However, it is to be understood that this problem is not exclusive to the case where the features and devices formed on the substrate are waveguides, but applies also when other optical features and/or active or passive optoelectronic devices are concerned. FIG. 1 illustrates the steps of a typical process for forming waveguides on a substrate. FIG. 1A shows a typical substrate 1 made of silica and having a diameter of 100–150 mm.

In a first stage of the process, a first core glass layer 2, of around 6 $\mu$m thickness and made of doped silica, is deposited on the substrate 1, as illustrated in FIG. 1B. Typically, the silica is doped with $GeO_2$ (sometimes with $P_2O_5$ or $B_2O_3$ added), but other dopants can be used, for example $TiO_2$. The doped silica is deposited by any convenient technique, for example, flame hydrolysis deposition (FHD), plasma enhanced chemical vapour deposition (PECVD), or atmospheric pressure chemical vapour deposition (APCVD).

In a second stage of the process, a mask layer 3 is formed on the core layer 2, as illustrated in FIG. 1C, by a process such as PECVD, thermal or electron-beam evaporation, or sputtering. The mask 3 layer may be made of any suitable mineral material and typically has a thickness of 0.5 to 5 $\mu$m. The core layer 3 is patterned, using standard photolithography and etching processes (for example, reactive ion etching, RIE), so as to define the shapes of the cores of the waveguides which it is desired to form on the substrate, as well as alignment marks for use in subsequent processing.

In the next stage of the process, the core layer 2 is etched through the openings of the mask material by any suitable etching process (for example, RIE) to remove unwanted portions of the core layer, as illustrated in FIG. 1D. The mask material is eliminated, for example by high pressure plasma etching, to leave only the desired core pattern 2a, and alignment marks 2b, as illustrated in FIG. 1E. Then, in a final stage of the process, an overclad layer 4, typically 20 $\mu$m thick and made of silica ($SiO_2$) doped with $B_2O_3$ and/or $P_2O_5$, is deposited over the etched core patterns by a process such as FHD or APCVD, as illustrated in FIG. 1F. Although the surface of the overclad layer 4 is not usually as flat as represented in FIG. 1F, it smoothly covers the cores of the waveguides.

When it is desired to create a new pattern in a layer superposed on the overclad layer 4, aligned with the underlying patterns, there is a problem because of low contrast of the core patterns and alignment marks under the overclad. Despite the transparency of the overclad material, the underlying core patterns and alignment marks have a fuzzy aspect because of the relatively large thickness of the overclad layer 4. Moreover, the smooth topography leads to a great uncertainty as to the location of the center of the core pattern with respect to which the superposed pattern is to be aligned.

Incidentally, the conventional process could equally well have been described with reference to formation of waveguides on a silicon substrate. However, in such a case, there would be an extra step involved, namely the creation (for example, by thermal growth and PECVD) of a relatively thick (>15 $\mu$m) silica underlayer interposed between the substrate and the core layer.

SUMMARY OF THE INVENTION

In order to solve the problem identified above, the present invention provides a method for forming a planar lightwave circuit or lightwave optical circuit in which one or more high-visibility alignment marks are created in a core layer. These high-visibility alignment marks enable optical features and/or devices in superposed layers to be accurately aligned with respect to the lower core pattern(s).

More particularly, the present invention provides a method of manufacturing a planar lightwave circuit or lightwave optical circuit, comprising the following steps: providing a substrate layer; forming a core layer on the substrate layer; creating a mask on the core layer, the mask being formed of a refractory material, and the mask comprising a first portion defining a first pattern and a second portion defining a second pattern, the first pattern corresponding to a desired pattern to be formed in the core layer and the second pattern corresponding to one or more alignment marks; etching the core layer through the mask whereby to expose portions of the substrate not overlaid by the first and second portions of the mask; removing the first portion of the mask whereby to expose the desired pattern in the core layer while leaving the second portion of the mask in place; forming an overclad layer on the exposed portions of the substrate, the desired pattern in the core layer and the second portion of the mask.

The present invention also provides a method of aligning optical devices in a planar lightwave circuit or lightwave optical circuit, comprising the following steps: creating a first circuit layer by providing a substrate layer, forming a core layer on the substrate layer, creating a mask on the core layer, the mask being formed of a refractory material, and the mask comprising a first portion defining a first pattern and a second portion defining a second pattern, the first pattern corresponding to a desired pattern to be formed in the core layer and the second pattern corresponding to one or more alignment marks, etching the core layer through the mask whereby to expose portions of the substrate not overlaid by the first and second portions of the mask, removing the first portion of the mask whereby to expose the desired pattern in the core layer while leaving the second portion of the mask in place, and forming an overclad layer on the exposed portions of the substrate, the desired pattern in the core layer and the second portion of the mask; and creating a second circuit layer, overlaid on the first circuit layer, the second circuit layer comprising at least one optical device located at a determined position; wherein in the step of creating the second circuit layer the position of the at least one optical device is controlled with reference to the one or more alignment marks in the first circuit layer.

The methods according to the invention provide the advantage that they create alignment marks which, because of the mask material remaining thereon, are highly visible, even through a relatively thick overclad layer (of the order of 10's of micrometers). Moreover, because the alignment marks are formed on the substrate in the same lithography/etching steps as the core patterns on the substrate, the relative positions of the alignment marks and these core patterns are very accurately defined (auto-alignment). Indeed, the accuracy of the alignment is defined by the accuracy of the master mask and can be better than 0.1 µm. Furthermore, the highly-visible alignment marks are created by a very simple process using standard processing.

In the methods according to the invention, the first mask portion can be removed from the etched core layer (while leaving the second mask portion in place) by using a specific lithography step to define an auxiliary mask shielding the second mask portion, then etching to remove the first mask portion, and removing this auxiliary mask. Alternatively, if the alignment marks are sufficiently far away from the core pattern(s), it is possible simply to cover the second portion of the mask with a polymer material, remove the first portion of the mask (for example by a plasma treatment), then remove the polymer material.

In the methods of the present invention, the mask is made of a refractory material in view of the need to withstand the high temperatures (typically 800° C. to 1300° C.) involved in creation of the overclad layer.

In some embodiments of the invention, the mask material may be silicon. Use of a silicon mask results in alignment marks having a highly-visible, metallic aspect. Moreover, because the silicon mask material is fully compatible with silicon and silicon dioxide layers (such as those used in the substrate and core layers) there will be no contamination of the optical layers by the mask material during the process of forming the overclad layer.

In those embodiments of the invention in which a silicon mask is used, it can be advantageous, in some circumstances, to include an additional step consisting of partially oxidising the second portion of the mask, before forming the overclad layer. This partial oxidation step creates a barrier layer which prevents an outgassing phenomenon which can sometimes occur during the formation of the overclad layer. The outgassing phenomenon consists in the emission of gas from the (amorphous) silicon mask layer, which gas could otherwise create bubbles in the overclad layer and reduce the visibility of the alignment marks. The partial oxidation step should involve subjecting the second mask portion to a temperature of around 1000° C. for approximately at least 5 minutes in ambient atmosphere.

BRIEF DESCRIPTION OF THE DRAWINGS

Further features and advantages of the present invention will become clear from the following description of representative embodiments thereof, given by way of example, and illustrated by the accompanying drawings, in which:

FIG. 1 illustrates the steps of a conventional method of manufacturing waveguides on a substrate, in which:

FIG. 1A shows a silica substrate,

FIG. 1B shows a core layer deposited on the substrate of FIG. 1A,

FIG. 1C shows a mask layer formed on the core layer of FIG. 1B,

FIG. 1D shows the structure of FIG. 1C after an etching step,

FIG. 1E shows the structure of FIG. 1D after removal of the mask, and

FIG. 1F shows an overclad layer formed on the structure of FIG. 1E; and

FIG. 2 illustrates the method of the present invention, here applied to the manufacture of waveguides on a substrate, in which:

DETAILED DESCRIPTION OF THE PREFERRED EMBODIMENTS

The method of manufacturing a planar or integrated optical circuit according to the present invention will now be described with reference to FIG. 2.

Figure 2A:
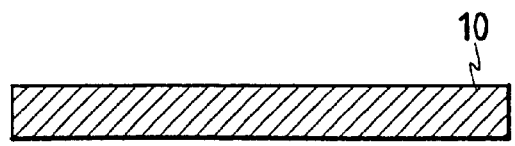
FIG. 2A shows a substrate.
Figure 2B:
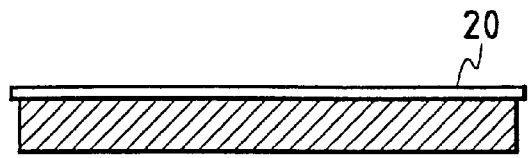
FIG. 2B shows a core layer deposited on the substrate of FIG. 2A.

FIG. 2A shows a typical substrate 10 made of silica, as in the prior art. (Again, it is to be understood that the process according to the invention can be applied in the case of use of a silicon substrate.) In a first stage of the process, a first core glass layer 20, of around 6 µm thickness and made of doped silica, is deposited on the substrate 10, as illustrated in FIG. 2B; conventional deposition processes may be used.

Figure 2C:
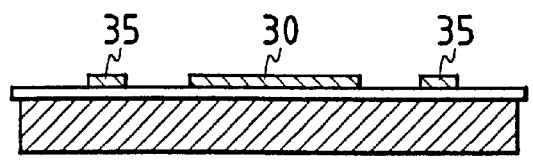
FIG. 2C shows a mask layer formed on the core layer of FIG. 2B.

In a second stage of the process, a mask layer 30 is formed on the core layer 20, as illustrated in FIG. 2C. In this embodiment of the present invention, the mask is made of amorphous silicon 0.5–5 µm thick, deposited and patterned by any conventional technique. The mask is patterned so as to have two portions: a first portion 30 defines the shapes of the cores of the waveguides (or other optical devices) which it is desired to form on the substrate 20, whereas a second portion 35 defines one or more alignment marks. It is the shape of the opening(s) in the first portion (30) of the mask which corresponds to the shape of the desired core pattern (s), whereas it is the shape of the second mask portion (35) itself which corresponds to the shape of the alignment mark(s). A plurality of alignment marks may be formed (for example, two), each having a cross-shape with a width of a few micrometers.

Figure 2D:
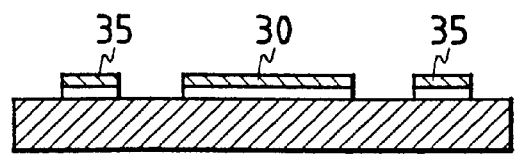
FIG. 2D shows the structure of FIG. 2C after an etching step.
Figure 2E:
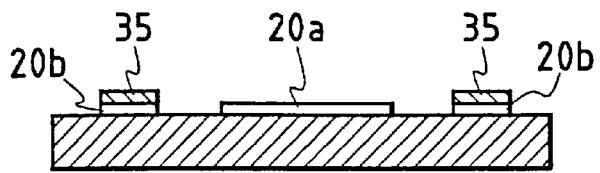
FIG. 2E shows the structure of FIG. 2D after selective removal of portions of the mask layer.

In the next stage of the process, the core layer 20 is etched through the openings of the mask material, by any convenient process, to leave both the desired pattern 20a in the core material and alignment marks 20b, as illustrated in FIG. 2D. The first portion 30 of the mask material is now eliminated to leave the desired core pattern 20' exposed, without removing the second mask portion 35, as illustrated in FIG. 2E. This can be achieved in a number of ways. The first mask portion 30 can be removed from the etched core layer (while leaving the second mask portion in place) by using a specific lithography step to define an auxiliary mask shielding the second mask portion, then etching (for example, using standard photolithography and high pressure etching techniques) to remove the first mask portion, and removing this auxiliary mask by conventional methods. Alternatively, if the alignment marks are sufficiently far away from the core pattern(s), it is possible simply to place a drop of polymer, for example standard photoresist, over the second portion of the mask 35, remove the first portion of the mask (for example by a plasma treatment using $SF_6$), then remove the polymer (for example using an oxygen plasma).

The process so far has resulted in an intermediate product which is a standard wafer except that it bears alignment marks that are highly-visible due to their metallic aspect. The relative position of these black-looking alignment marks with respect to the desired core pattern(s) 20' is very accurately defined (±1.0 μm) because they are created in the same processing steps.

Figure 2F:
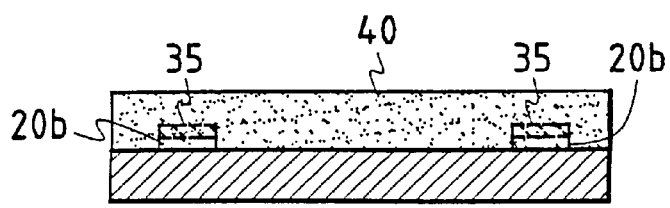
FIG. 2F shows an overclad layer formed on the structure of FIG. 2E.

Next, an overclad layer 40, made of doped silica as in the conventional process and typically 20 μm thick, is deposited over the etched core pattern(s) 20' and masked alignment marks (35), as illustrated in FIG. 2F. Deposition of the overclad layer involves a process such as PECVD, APCVD, or FHD performed at a temperature of 300° C. to 1300° C. followed by an annealing process cycling between 800° C. and 1300° C. The mask material 35 is not destroyed by this overclad-deposition process because it is a refractory material, moreover the optical layers are not contaminated because the mask material has been chosen to be silicon, which is compatible with the optical layers.

It has been found that, in some circumstances, gas bubbles can escape from the mask portion 35 during the overclad-deposition process. This is an outgassing phenomenon occurring, presumably, because the amorphous silicon mask material is porous. This outgassing is undesirable because it can lead to formation of bubbles in the overclad layer overlying the alignment marks, impairing their visibility.

It has been found, experimentally, that the significance of this outgassing phenomenon depends upon the surface area of the alignment marks and on the process used for depositing the silicon mask layer/overclad layer. For alignment marks of small surface area, or when certain deposition processes are used, there is no need to take any special steps to counter this phenomenon. However, in other cases it is advantageous to include an additional step in the methods according to the present invention, just before the overclad-deposition step.

The additional step consists of partially oxidising the second portion 35 of the mask, before forming the overclad layer. This partial oxidation step oxidises the exterior portion of each grain of the amorphous silicon mask material, leaving the center portion of the grain unaffected (i.e. still silicon). This creates a barrier layer overlying the alignment marks, which prevents the outgassing phenomenon. Complete oxidation of the mask material 35 is to be avoided as this would render the mask material transparent and fail to enhance visibility of the alignment marks 20b.

The partial oxidation step may be performed by subjecting the second mask portion 35 to a temperature of around 1000° C. for 5 to 10 minutes in ambient atmosphere. This results in a layer of partially-oxidised silicon, overlying the alignment marks, which has a reddish color and is highly-visible even after deposition of the overclad layer. Incidentally, the alignment marks are highly-visible both on transparent substrates and on opaque substrates.

During the partial oxidation process, there is no need to take special steps to protect portions of the structure other than the mask material 35. This is because such other portions of the structure (exposed substrate and core pattern portions) will either already consist of silica or else, where a silicon substrate is used and has become exposed, will consist of single-crystal silicon which oxidises relatively slowly compared with amorphous silicon.

Now, when it is desired to create one or more new pattern(s) in a layer superposed on the overclad layer 40, aligned with the underlying core pattern(s) 20a, there is no alignment problem, because of the extremely-visible alignment marks 20b. These alignment marks will, in general, be used as references in the lithography step defining the mask used for etching the new pattern(s).

In the above description the mask material used was amorphous silicon. However, it is to be understood that the present invention is not limited to the use of such a material. More generally, other non-transparent, refractory materials may be used, for example SiC or other carbides, or metals (for example tungsten and chromium). Depending upon the choice of mask material, it may be necessary to create an oxide layer over the mask material which remains on the alignment marks, in order to ensure that the optical layers are not contaminated during the overclad-deposition process.

What is claimed is:

1. A method for manufacturing a planar optical circuit on substrate, the method comprising the steps of:

forming a core layer on the layer;

creating a mask on the core layer, the mask being formed of a refractory material, the mask having a first portion defining a first pattern and a second portion defining a second pattern, the first pattern corresponding to a desired pattern to be formed in the core layer and the second pattern corresponding to one or more alignment marks;

etching the core layer through the mask to expose portions of the substrate not overlaid by the first portion and the second portion of the mask;

removing the first portion of the mask to create exposed portions of the core layer corresponding to the desired pattern in the core layer, while leaving the second portion of the mask in place;

partially oxidising the second portion of the mask; and forming an overclad layer on the exposed portions of the core layer and the second portion of the mask.

2. The method of claim 1 wherein the step of removing the first portion of the mask further comprises the steps of:

covering the second portion of the mask with a polymer material;

removing the first portion of the mask using a plasma treatment; and removing the polymer material.

3. The method of claim 1 wherein the mask is amorphous silicon.

4. The method of claim 3 wherein the step of partially oxidizing the second portion of the mask further comprises the step of:

subjecting the second portion of the mask to a temperature of about 1000° C. for at least five minutes in an ambient atmosphere.

5. A method of aligning optical devices of a first optical circuit and a second overlaid optical circuit of a planar optical circuit on a substrate, the method comprising the steps of:

creating a first circuit layer on the substrate, the first circuit layer defining a core layer;

creating a mask on the core layer, the mask being formed of a refractory material, the mask having a first portion defining a first pattern and a second portion defining a second pattern, the first pattern corresponding to a desired pattern to be formed in the core layer and the second pattern corresponding to one or more alignment marks;

etching the core layer through the mask to create exposed portions not overlaid by the first portion and the second portion of the mask;

removing the first portion of the mask to expose the desired pattern in the core layer while leaving the second portion of the mask in place;

partially oxidising the second portion of the mask;

forming an overclad layer on the exposed portions of the core layer corresponding to the desired pattern in the core layer, while leaving the oxidized second portion of the mask in place;

creating a second circuit layer overlaid on the first circuit layer, the second circuit layer having at least one optical feature to be disposed at a predetermined position, the predetermined position of the at least one optical feature being controlled by alignment of said at least one optical feature to the one or more alignment marks in the first circuit layer.

6. The method of claim 5 wherein the step of removing the first portion of the mask further comprises the steps of:

covering the second portion of the mask with a polymer material;

removing the first portion of the mask using a plasma treatment; and removing the polymer material.

7. The method of claim 5 wherein the mask is amorphous silicon.

8. The method of claim 7, wherein the step of partially oxidising the second portion of the mask further comprises the step of:

subjecting the second portion of the mask to a temperature of about 1000° C. for at least five minutes in an ambient atmosphere.

* * * * *